US006289361B1

(12) United States Patent
Uchida

(10) Patent No.: US 6,289,361 B1
(45) Date of Patent: *Sep. 11, 2001

(54) DOCUMENT DISPLAY APPARATUS FOR DISPLAYING A PLURALITY OF MULTIMEDIA DOCUMENTS

(75) Inventor: Shinichiro Uchida, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/018,392

(22) Filed: Feb. 4, 1998

(30) Foreign Application Priority Data

Feb. 4, 1997 (JP) .................................. 9-021760

(51) Int. Cl.[7] ...................................... G06F 15/00
(52) U.S. Cl. .................... 707/501; 707/517; 707/520; 707/526; 345/339; 345/340; 345/342; 345/343; 345/346
(58) Field of Search ................................... 707/501, 513, 707/500, 526, 517, 520; 345/302, 327, 328, 339–346, 472

(56) References Cited

U.S. PATENT DOCUMENTS

| | | | |
|---|---|---|---|
| 5,214,755 * | 5/1993 | Mason .................................. | 707/521 |
| 5,333,237 * | 7/1994 | Stefanopoulos et al. ............. | 707/501 |
| 5,408,659 * | 4/1995 | Cavendish et al. ................... | 707/501 |
| 5,526,520 * | 6/1996 | Krause ................................... | 707/104 |
| 5,550,965 * | 8/1996 | Gabbe et al. ........................ | 707/512 |
| 5,556,282 * | 9/1996 | Middlebrook .......................... | 434/178 |
| 5,713,740 * | 2/1998 | Middlebrook .......................... | 434/178 |
| 5,802,299 * | 9/1998 | Logan et al. .......................... | 707/501 |
| 5,802,530 * | 9/1998 | Van Hoff .............................. | 707/513 |
| 5,818,439 * | 10/1998 | Nagasaka et al. .................... | 345/327 |
| 5,890,170 * | 3/1999 | Sidana ................................... | 707/501 |
| 5,903,264 * | 5/1999 | Moeller et al. ........................ | 345/327 |
| 5,930,809 * | 7/1999 | Middlebrook ......................... | 707/501 |
| 5,956,736 * | 9/1999 | Hanson et al. ........................ | 707/513 |
| 6,134,565 * | 10/2000 | Hommersom et al. .............. | 707/517 |

OTHER PUBLICATIONS

Albert Wong, Acrobat Reader, 1995, Adobe Systems Incorporated, Version 2.1, screen shot, pp. 1–3.*
Yashiro et al., A New Method of Document Structure Extraction Using Generic Layout Knowledge, Apr. 1989, IEEE, pp. 282–287.*
Brown, Using Netscape 2, Que Corporation, p. 153, 1995.*
"FVWM 2.0—Fantastic Virtual Window Manager", Internet Home Page of University of Victoria, Faculty of Fine Arts, Canada, Jan. 13, 1997.

* cited by examiner

*Primary Examiner*—Joseph H. Feild
*Assistant Examiner*—Cong-Lac Huynh
(74) *Attorney, Agent, or Firm*—Nixon & Vanderhye P.C.

(57) ABSTRACT

It is an object of the invention to provide a document display apparatus capable of displaying a plurality of documents which are related to each other in high visibility as a whole without displaying the plurality of documents on single display means at the same time. When a document selecting area is displayed on a display screen of a display section and a single area is selected among a -plurality of areas in the document selecting area, document data corresponding to that selected single area is displayed within a document displaying area on the display screen. Accordingly, the relationship among a plurality of documents, e.g. the positional relationship, may be perceived by the positional relationship of each area in the document selecting area and specific document data may be perceived by displaying within the document displaying area. Accordingly, the plurality of documents can be displayed in high visibility as a whole without displaying the plurality of documents on the single display at the same time.

29 Claims, 18 Drawing Sheets

| AREA IDENTIFIER | STARTING POINT | ENDING POINT | DOCUMENT NAME |
|---|---|---|---|
| 1 | (0, 0) | (30, 100) | FIRST DOCUMENT |
| 2 | (30, 0) | (100, 50) | SECOND DOCUMENT |
| 3 | (30, 50) | (100, 100) | THIRD DOCUMENT |

STATE A1

SET AREA
(0, 0) − (30, 100)

STATE A2

SET AREA
(30, 0) − (100, 50)

STATE A3

SET AREA
(30, 50) − (100, 100)

STATE A4

| TYPE OF DISPLAYED ELEMENT 15 | ELEMENT IN REDUCED DISPLAY 16 |
|---|---|
| LETTER | DOTTED LINE |
| PICTURE | RECTANGLE |
| GRAPHIC | SCALED DOWN |

<FRAMESET COLS="50%,50%>

<FRAME SRC="document1.html">

<FRAMESET ROWS="40%,60%>

<FRAME SRC="document2.html">

<FRAME SRC="document3.html">

DOCUMENT DISPLAY APPARATUS FOR DISPLAYING A PLURALITY OF MULTIMEDIA DOCUMENTS

BACKGROUND OF THE INVENTION

1. Field of the Invention

The present invention relates to a document display apparatus for displaying multi-media documents containing pictures and letters.

2. Description of Related Art

FIG. 23 shows a display screen 30 of a prior art document display apparatus. The prior art document display apparatus can store document data of a plurality of multimedia documents for displaying them. The document data includes related data indicative of whether the documents are in relation to each other. The related data indicates whether the document data needs to be displayed on the display screen at the same time for example. The data of the documents indicated as being related to each other by such related data is displayed respectively in a plurality of document displaying areas 31a through 31c partitioned in the display screen 30 as shown in FIG. 23.

When all the document data cannot be displayed in one document displaying area, moving means such as a scroll bar 32 allows the document data to be scrolled and displayed within the document displaying area. Thereby, all the document data can be displayed in a split form.

Such a displaying method is suitably implemented in handling documents described in HTML language in particular as multi-media documents. In the case of the HTML language it is possible to designate simultaneous display of a plurality of documents by its frame function. When the frame function is executed, the prior art HTML browser splits a display screen into a predetermined number of parts to display a result of layout of the plurality of documents at the same time. This function is adopted in Netscape Navigator of Netscape Communications Corporation and in Internet Explorer of Microsoft Corporation.

However, when the resolution of the display is low or when the display area is small, the boundary of adjacent areas and a scroll bar portion in each individual area occupy a large proportion of the whole document display area. Further, the size of font is limited in terms of readability and the data display capacity is limited in small document display apparatus for portable use. Accordingly, when a plurality of documents are displayed on one single display screen at the same time, a display quantity allocated to each document reduces and the visibility drops as a whole. The drop in visibility of the whole poses a problem especially when it is designated to display the plurality of documents at the same time by the above-mentioned frame function of the HTML language to Indicate a specific meaning by the plurality of documents as a whole.

SUMMARY OF THE INVENTION

Accordingly, It Is a n object of the present invention to provide a document display apparatus capable of highly visibly display ing a plurality of documents related to each other as a whole without displaying the plurality of documents on single display means at the same time.

The present invention provides a document display apparatus comprising:

memory means for storing document data of a multimedia document containing pictures, letters and the like for displaying, the document data containing related data indicative of whether or not the document data Is in relation to document data of other document;

display means having a document displaying area capable of displaying the document data;

display control means for causing the display means to display a document selecting area composed of a plurality of areas, each corresponding to a plurality of documents, when a single area is s elected from the plurality of areas of the document selecting area, to display document data corresponding to the selected single area in the document displaying area of the display means.

According to the invention, the document selecting area is displayed on the display means and when the single area is selected from the plurality of areas in the document selecting area, the document data corresponding to the selected area is displayed in the document displaying area of the display means. Therefore, relationships among the plurality of documents, e.g. positional relationships, may be perceived by positional relationships among the areas in the document selecting area. Further, specific document data may be viewed by displaying in the document displaying area. The document displaying area and the document selecting area may be both displayed on the display means. Thus, the plurality of documents may be displayed at high visibility as a whole without displaying the plurality of documents on single display means at the same time.

The invention is also characterized in that the display control means causes the display means to display the document selecting area only when it is indicated by means of related data of predetermined document data that the predetermined document data is in relation to other document data.

According to the invention, the document selecting area is displayed not always, but when the document data is in relation to other document data, so that it is possible to know whether or not the related document data exists, by the existence of the document selecting area. Further, because no unnecessary area is displayed when only the document displaying area is displayed, i.e. when there is no related document data, the visibility can be improved.

Furthermore, the invention is characterized in that the document selecting area is movably displayed on the display means and the document display apparatus comprises moving means for moving the document selecting area.

According to the invention, the document selecting area is movably displayed and may be displayed at a position to which the document selecting area is instructed by the moving means to move. For instance, the document selecting area may be displayed overlapping with the document displaying area. Accordingly, the visibility can be improved by displaying the document selecting area so that it can be viewed readily by the operator.

Furthermore the present invention is characterized in that the document selecting area is erasably displayed on the display means and the document display apparatus comprises designating means for designating whether the document selecting area should be displayed or erased.

According to this aspect of the invention, the document selecting area is erasably displayed and may be erased by an instruction of doing so provided by the designating means. The visibility can be improved by erasing the unnecessary document selecting area after defining the document to be displayed in the document displaying area for example.

The invention further provides a document display apparatus comprising:

memory means for storing document data of a multimedia document containing pictures, letters and the like for displaying, the document data containing related data indicative of whether or not the document data is in relation to document data of other document;

display means having a document displaying area in which the document data can be displayed;

designating means for designating display of a document selecting area composed of a plurality of areas each corresponding to a plurality of documents, on the display means; and display control means for causing the display means to display the document selecting area instead of the document displaying area on the basis of the instruction from the designating means, and, when a single area is selected from the plurality of areas of the document selecting area, for causing the display means to display the document displaying area instead of the document selecting area and to display document data corresponding to the selected area in the document displaying area.

According to the invention, only the document selecting area can be displayed on the display means. That is, when a document to be displayed in the document displaying area is selected, only the document selecting area may be displayed. At this time, the visibility can be improved by expanding and displaying the document selecting area across the whole display screen.

Furthermore the invention is characterized in that the display control means converts the document data under a predetermined converting condition to cause the converted document data to be displayed within a corresponding area of the document selecting area.

According to the invention, the corresponding document data which has been converted under the predetermined converting condition is displayed in each area in the document selecting area. Accordingly, the outline of the document data may be perceived also in the document selecting area.

Further the invention is characterized in that the document display apparatus further comprises reading means for reading document data from an original which is a multi-media document or receiving means for receiving document data from an external terminal apparatus and that the memory means stores the document data obtained by the reading means or the receiving means.

According to the invention, the document selecting area and the document displaying area as described above may be created with respect to the document data obtained by the reading means or the receiving means.

Further the invention is characterized in that the display control means causes the display means to display that the reading means or the receiving means is in the midst of obtaining the document data.

According to the invention, it is displayed and informed that the reading means or the receiving means is in the midst of obtaining the document data. For instance, it is informed by flashing the display that the document data is being obtained. Accordingly, the operator can readily perceive that it is in the midst of obtaining the document data.

Further the invention is characterized in that the memory means stores not only the document data corresponding to a single area when the single area is selected from the plurality of areas in the document selecting area but also the document data corresponding to the remaining areas not selected.

According to the invention, the memory means stores not only the document data corresponding to the single area selected from the plurality of areas in the document selecting area, but also the document data corresponding to the remaining areas not selected. Accordingly, all the document data may be stored and changes and the like of the display within the document displaying area may be readily implemented by using the document data.

Further the invention is characterized in that the document data is described in the HTML language which allows to designate either of execution of a frame function for displaying the document data together with other document data or non-execution of the frame function, and that the display control means causes the display means to display the document selecting area when the execution of the frame function is designated.

According to this aspect of the invention, the document selecting area is displayed on the display means when the execution of the frame function is designated by the HTML language, and the document data corresponding to the selected area is displayed within the document displaying area of the display means when the single area is selected from the plurality of areas in the document selecting area. Accordingly, the plurality of documents may be displayed in high visibility as a whole without displaying the plurality of documents on the single display means at the same time even when the document data is described in the HTML language.

Further the invention is characterized in that the display control means causes the document data described in the HTML language to be displayed within the document displaying area in the case where the non-execution of the frame function is designated for said document data.

According to this aspect of the invention, because the document data for which non-execution of the frame function is designated is displayed immediately within the document displaying area, the document may be displayed in the document displaying area without implementing the operation of selecting a single area from the document selecting area, thus improving the operability. The two functions of displaying the selected document in the document displaying area by using the document selecting area when the frame function is to be executed, and of displaying the document immediately in the document displaying area when the frame function is not executed on the other hand, may be appropriately executed.

BRIEF DESCRIPTION OF THE DRAWINGS

Other and further objects, features, and advantages of the invention will be more explicit from the following detailed description taken with reference to the drawings wherein:

FIG. 3 is a flow chart showing an operation for creating a document selecting area 8 of the document display apparatus 1a;

FIG. 4 is a table showing document arrangement information 10a;

DETAILED DESCRIPTION OF THE PREFERRED EMBODIMENTS

Figure 1:
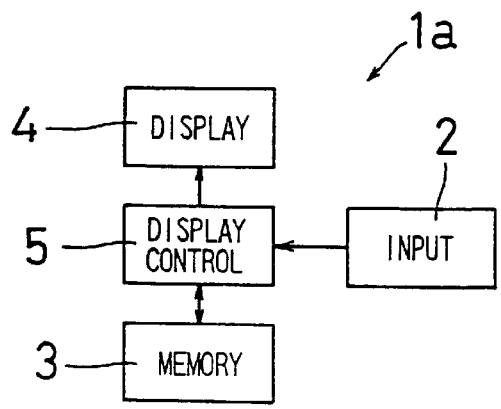
FIG. 1 is a block diagram showing an electrical structure of a document display apparatus 1a according to a first embodiment of the present invention.

Now referring to the drawings, preferred embodiments of the invention are described below.

FIG. 1 is a block diagram showing an electrical structure of a document display apparatus 1a according to a first embodiment of the invention. The document display apparatus 1a comprises an input section 2, a memory section 3, a display section 4 and a display control section 5. The document display apparatus 1a is manufactured relatively small for the purpose of portability.

The memory section 3 is realized by a RAM (random access memory) or a ROM (read only memory) and stores at least document data. The document data is data for displaying a multi-media document containing pictures and letters and contains related data indicative of whether or not it is in relation to document data of other documents. The related data is data indicative of whether or not the document data needs to be displayed together with the document data of other documents on a display screen at the same time for example.

The display section 4 is realized by an LCD (liquid crystal display) for example and the display screen thereof has a document displaying area in which the document data can be displayed, and a document selecting area.

The display control section 5 is realized by a CPU (central processing unit) for example and controls the whole display operation of the document display apparatus 1a in accordance with a predetermined operation program. In concrete, it controls so that the document selecting area composed of a plurality of areas each corresponding to a plurality of documents which are in relation to each other is displayed on the display screen of the display section 4, and that when a single area is selected among the plurality of areas of the document selecting area, the document data corresponding to the selected area is displayed within the document displaying area of the display section 4.

A single area may be designated among the plurality of areas of the document selecting area from the input section 2. The input section 2 may be realized by a relatively small existing input device. It may be realized, for example, by a light transmitting tablet provided with an input plane disposed to overlap the display screen of the display section 4, and by an input pen for designating coordinate points on coordinate axes preset on the input plane. It may be also realized by a keyboard or the like.

Figure 2A:
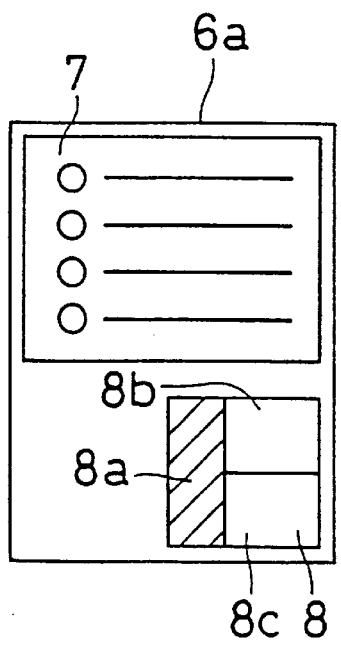
FIGS. 2A through 2C show display screens 6a through 6c of a display section 4.
Figure 2B:
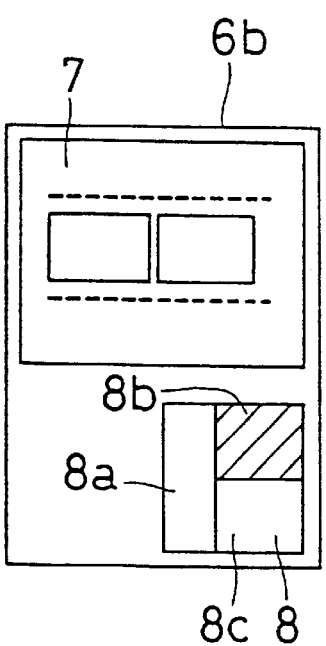
Figure 2C:
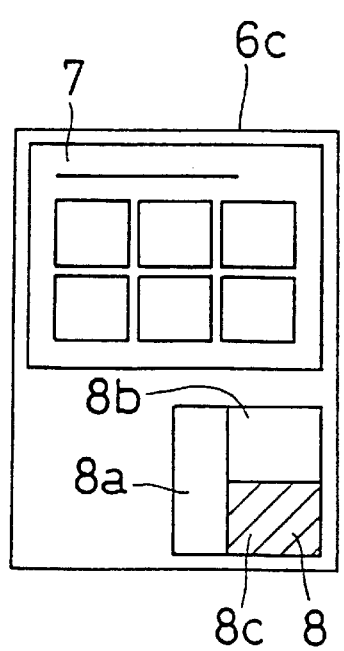

FIGS. 2A through 2C show the display screens 6a through 6c of the display section 4. Each of the display screens 6a through 6c has the document displaying area 7. The document selecting area 8 is displayed also on each of the display screens 6a through 6c, under the control by means of the display control section 5.

When related data of data of first through third documents indicates that the documents are related to each other for example, the document selecting area 8 composed of first through third areas 8a through 8c, each corresponding to the data of the first through third documents, is displayed. The document selecting area 8 shows a state, e.g. the relationship among the positions of each document, when the data of the three documents are displayed on the single display screen at the same time. That is, it shows that the data of the first document is displayed in the first area 8a, the data of the second document is displayed in the second area 8b and the data of the third document is displayed in the third area 8c. It is noted that the document displaying area 7 shows concrete contents of the document.

When the first area 8a among the document selecting areas 8a through 8c is designated by the input section 2, the area 8a is displayed while being highlighted by a different attribute from that of the other areas 8b and 8c, e.g. in color or by mesh as shown in FIG. 2A, and the data of the first document corresponding to the designated first area 8a is displayed in the document displaying area 7. Similarly to that, when the second area 8b is designated by the input section 2, the area 8b is highlighted and displayed as shown in FIG. 2B and the data of the second document corresponding to the second area 8b is displayed in the document displaying area 7. When the third area 8c is designated by the input section 2, the area 8c is highlighted and displayed as shown in FIG. 2C and the data of the third document corresponding to the third area 8c is displayed in the document displaying area 7.

Figures 3, 4:
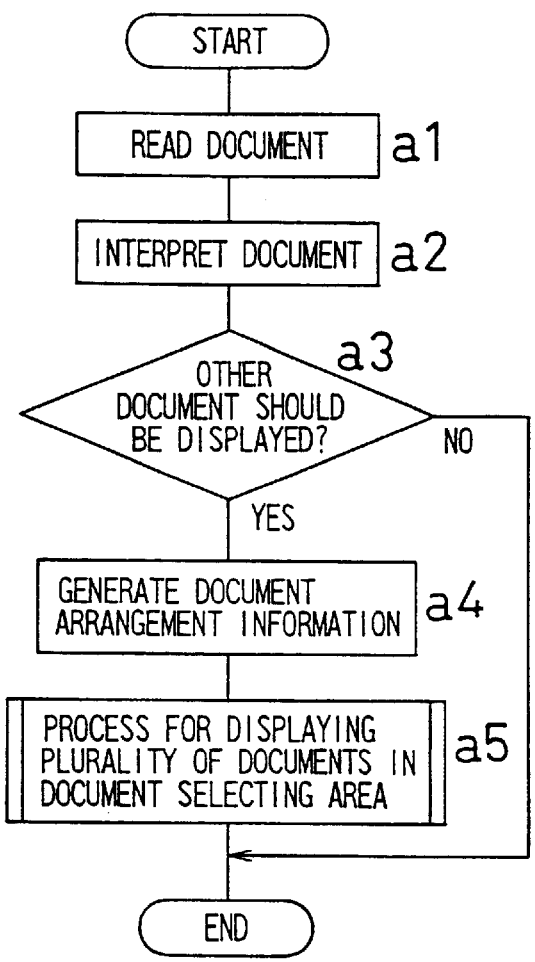

FIG. 3 is a flow chart showing an operation for creating the document selecting area 8 of the document display apparatus 1a. In Step a1, document data to be displayed is read to the document display apparatus 1a. The read data is then interpreted in Step a2. In Step a3, it is determined whether or not the read data is document data indicated as being in relation to data of other documents. That is, it is determined whether or not it is a document to be displayed together with the other document at the same time. When it is determined to be a document to be displayed together, the process advances to Step a4 and when it is not, the operation is finished.

In Step a4, document arrangement information 10a is generated. The document arrangement information 10a is, for example, in FIGS. 2A through 2C, information for designating the first through third areas 8a through 8c within the document selecting area 8 and comprises, as shown in FIG. 4, an area identifier 11 for identifying each area, a coordinate point 12 indicating a display starting point of each area, a coordinate point 13 indicating a display ending point of each area and each document name 14.

In Step a5, the document selecting area 8 composed of the first through third areas 8a through 8c is displayed on the display section 4 based on the document arrangement information 10a thus generated and an operation for displaying the plurality of documents by using the document selecting area 8 as described later is executed. Then, the operation is finished.

Figure 5:
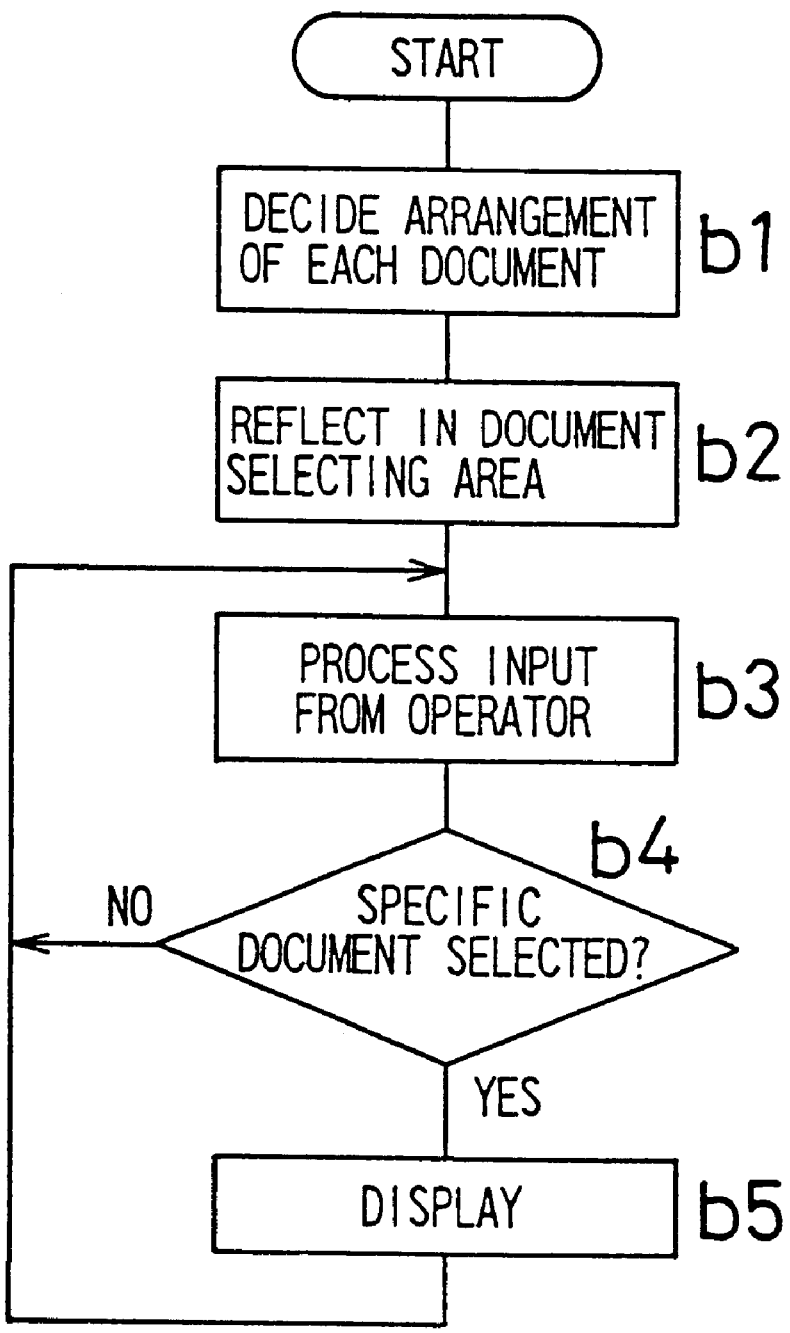
FIG. 5 is a flow chart detailing an operation for displaying a plurality of documents in Step a5 in FIG. 3.
Figure 6A:
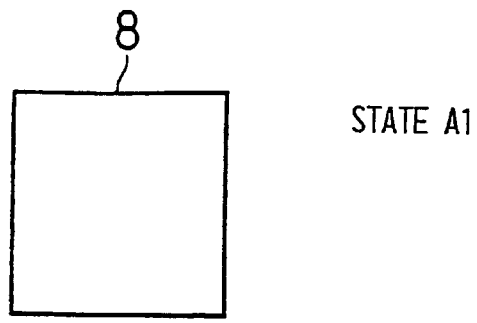
FIGS. 6A through 6D are drawings for explaining a procedure for setting a plurality of areas within the document selecting area 8.
Figure 6B:
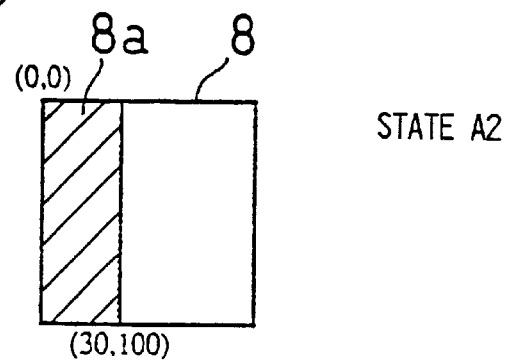
Figure 6C:
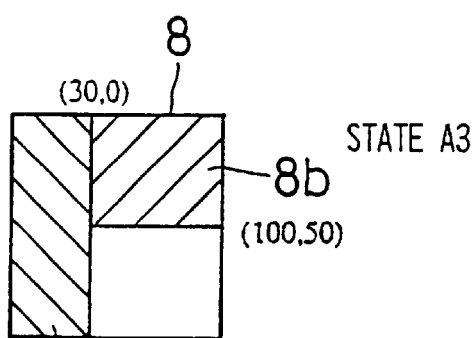
Figure 6D:
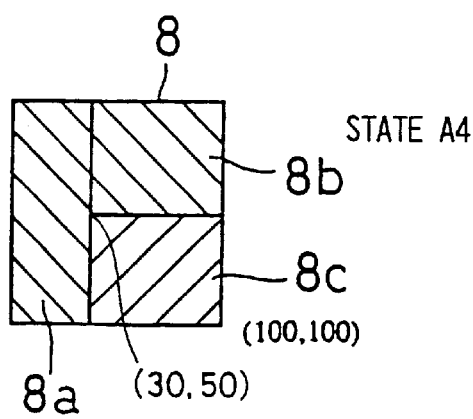

FIG. 5 is a flow chart detailing the operation for displaying the plurality of documents in Step a5 described above. In Step b1, it is decided how to arrange and display each document by using the document arrangement information 10a, and the decision is then reflected in the document selecting area 8 in Step b2. That is, on the basis of the document arrangement information 10a, within the document selecting area 8 in State A1 in FIG. 6A, the first area 8a is set in State A2 as shown in FIG. 6B, the second area 8b is set in State A3 as shown in FIG. 6C and the third area 8c is set in State A4 as shown in FIG. 6D.

An input from the operator is processed in Step b3. It is then determined in Step b4 whether or not a specific document has been selected by the input from the operator. It is determined whether or not any one of plurality of areas 8a through 8c in the document selecting area 8 has been designated and selected by the input pen of the input section 2 for example. When it is determined to have been selected, the process advances to Step b5 to display the document data corresponding to the selected area in the document displaying area 7 and then returns to Step b3. When it is determined to have not been selected, the process directly returns to Step b3.

As described above, according to the first embodiment, the document display apparatus 1a is arranged such that the document selecting area 8 is displayed on the display section 4 and when a single area is selected among the plurality of areas 8a through 8c in the document selecting area 8, the document data corresponding to the selected area is displayed within the document displaying area 7 of the display section 4, so that the relationship among the plurality of documents, e.g. the positional relationship, may be perceived by the positional relationship among the areas 8a through 8c in the document selecting area 8. The data of the selected specific document is displayed within the document displaying area 7, so that its concrete contents may be recognized. Because the document displaying area 7 and the document selecting area 8 can be both displayed on the display section 4, the plurality of documents may be perceived well as a whole without displaying the concrete contents of the plurality of documents in the single display section 4 at the same time. Particularly, it allows a display area occupied by data of one document to be large and the visibility to be improved even when the resolution of the display section 4 is low or the screen is small like a portable apparatus.

Figure 7:
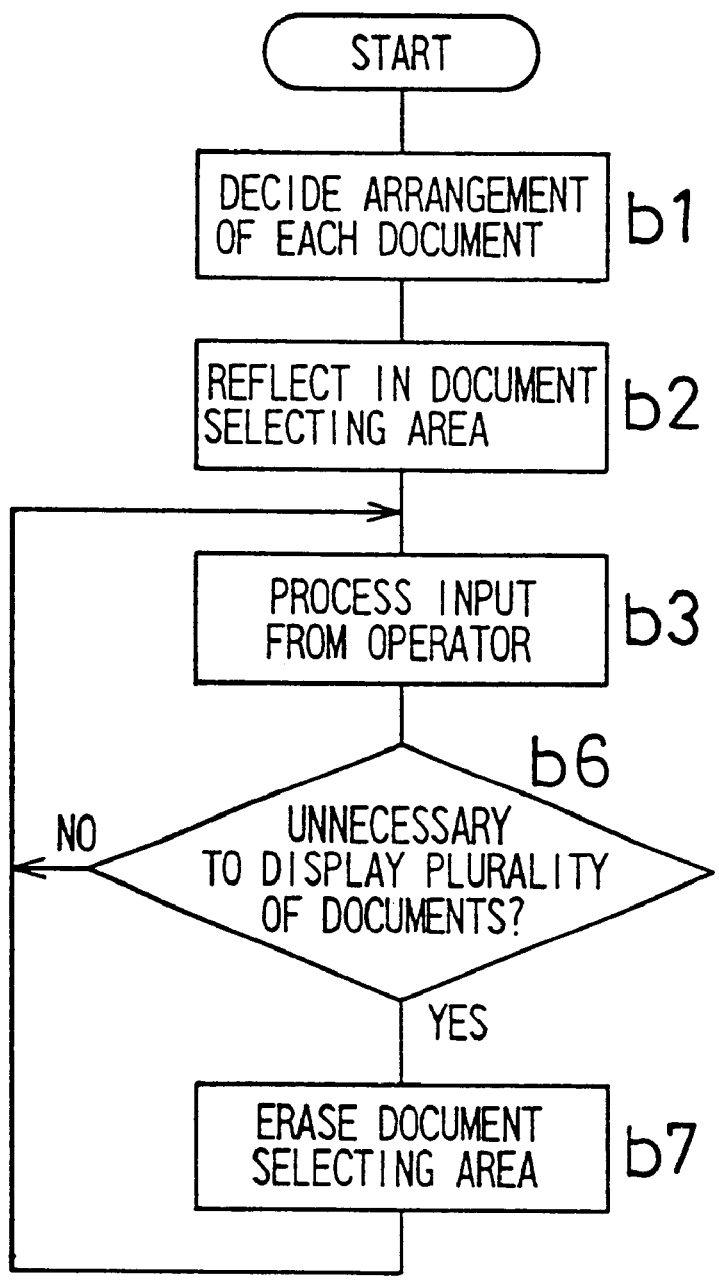
FIG. 7 is a flow chart showing an operation of a document display apparatus according to a second embodiment of the invention.

FIG. 7 is a flow chart showing an operation of a document display apparatus according to a second embodiment of the invention. While this document display apparatus is constructed in the same manner as the document display apparatus 1a, it is characterized in that the operation for displaying the plurality of documents in Step a5 in FIG. 3 is replaced as shown in FIG. 7, instead of that in FIG. 5. Because the flow chart in FIG. 7 is merely what Steps b6 and b7 are added to Steps b1 through b3 of the flow chart in FIG. 5, the explanation of the same operation and of the structure of the apparatus will be omitted here.

In Step b6 implemented after processing the input from the operator in Step b3, it is determined whether or not the input from the operator is what instructs to display a document which does not require to display a plurality of documents at the same time. When it is determined to be Yes, the process advances to Step b7 to erase the document selecting area 8 and directly returns to Step b3. When it is No, the process returns to Step b3.

As described above, according to the second embodiment, the document selecting area 8 is not always displayed. That is, the document selecting area 8 is not displayed when it is instructed by the input from the operator to display the document which does not require to display the plurality of documents at the same time. Accordingly, the document selecting area 8 may be displayed only when the data of the document is in relation to data of other document. Because no unnecessary area is displayed when the document displaying area 7 is only displayed, i.e. when there exists no related document data, the visibility may be improved.

Figure 8:
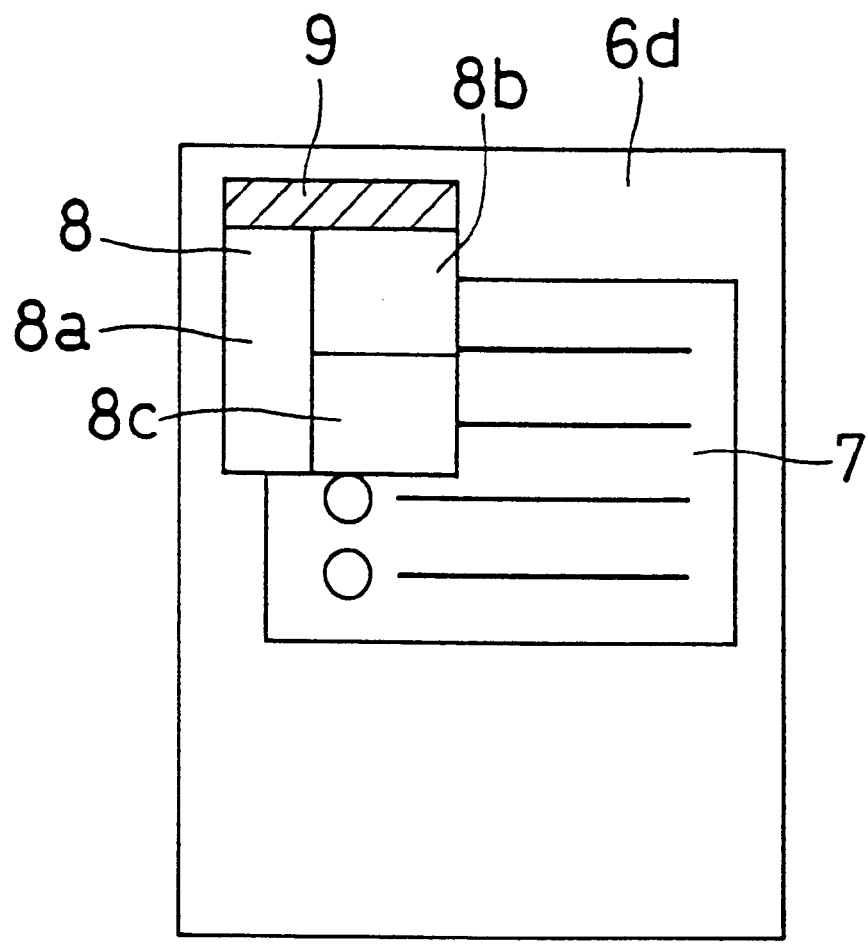
FIG. 8 shows a display screen 6d of a document display apparatus according to a third embodiment of the invention.

FIG. 8 shows a display screen 6d of a document display apparatus according to a third embodiment of the invention. While this document display apparatus is constructed in the same manner as the document display apparatus 1a described above, it is characterized in that the document selecting area 8 is movably displayed on the display section 4 and a destination designating area 9 for moving the document selecting area 8 is appended and displayed.

Figure 9:
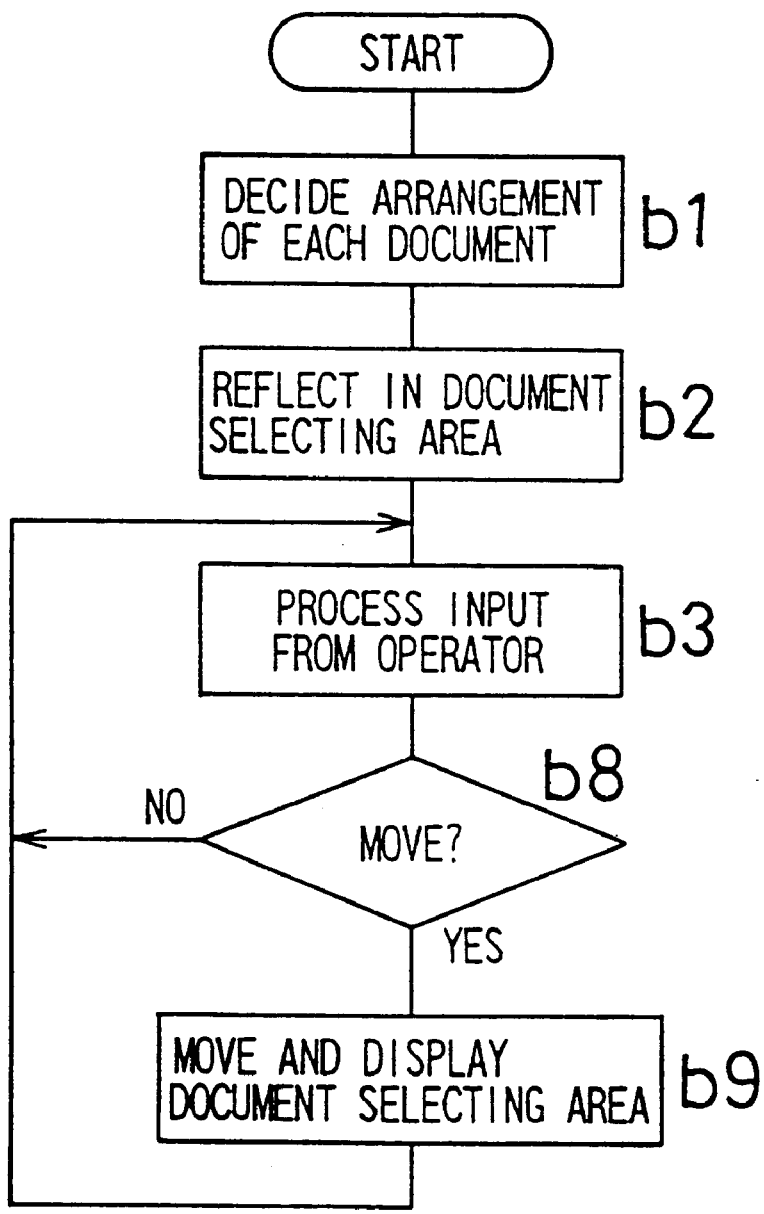
FIG. 9 is a flow chart showing an operation of the document display apparatus according to the third embodiment of the invention.

FIG. 9 is a flow chart showing an operation of the document display apparatus according to the third embodiment of the invention. This document display apparatus is characterized in that the operation for displaying the plurality of documents of the document display apparatus 1a in Step a5 in FIG. 3 is replaced as shown in FIG. 9, instead of that in FIG. 5. Because the flow chart in FIG. 9 is merely what Steps b8 and b9 are added to Steps b1 through b3 of the flow chart in FIG. 5, the explanation of the same operation and of the structure of the apparatus will be omitted here.

In Step b8 implemented after processing the input from the operator in Step b3, it is determined whether or not the input from the operator allows the document selecting area 8 to be moved. The designation for allowing the document selecting area 8 to be moved is implemented by pointing the movement destination designating area 9 by the input pen of the input section 2 for example. Thus, also the movement destination desiganting area 9 can be moved together with the document selecting area 8 on the display screen. When it is instructed to allow to move the area 8, the process advances to Step b9 to move the document selecting area 8 and the movement destination designating area 9 to a desired position and returns to Step b3. When no instruction to allow to move the area 8 is given, the process directly returns to Step b3. It is noted that the document selecting area 8 and the movement destination designating area 9 are fixed and displayed at the desired position by designating an end of the moving process from the input section 2 after moving the document selecting area 8 and the movement destination designating area 9 to the desired position.

As described above, according to the third embodiment, the document selecting area 8 is movably displayed together with the movement destination designating area 9. The document selecting area 8 and the movement destination designating area 9 may be displayed at the desired position by pointing the movement destination designating area 9 to allow the document selecting area 8 to be moved. For instance, they may be displayed by overlapping with the document displaying area 7 as shown in FIG. 8. Accordingly, the document selecting area 8 may be displayed so that the operator can readily see it and the visibility may be improved.

Figure 10:
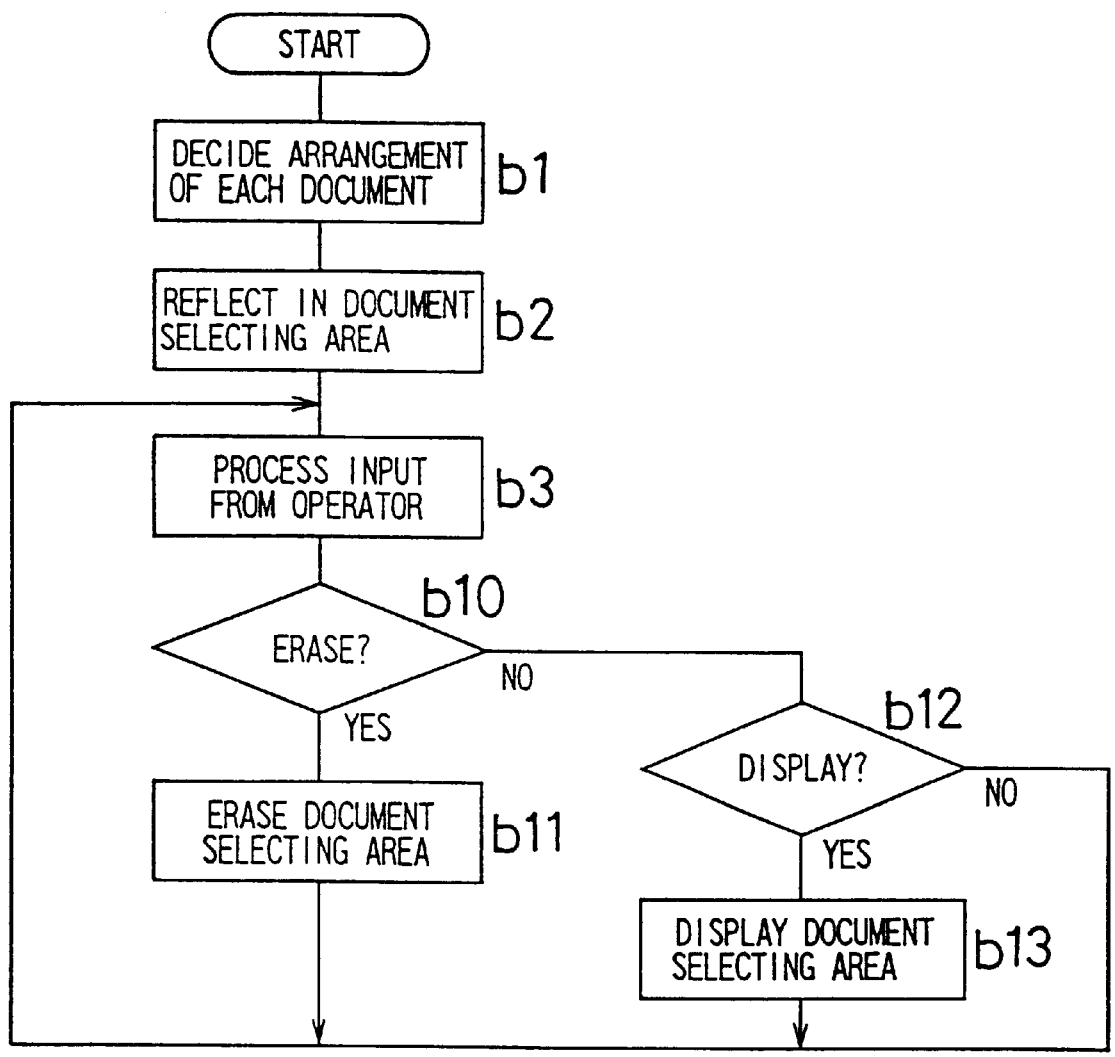
FIG. 10 is a flow chart showing an operation of a document display apparatus according to a fourth embodiment of the invention.

FIG. 10 is a flow chart showing an operation of a document display apparatus according to a fourth embodiment of the invention. While this document display apparatus is constructed in the same manner as the document display apparatus 1a, it is characterized in that the operation for displaying the plurality of documents in Step a5 in FIG. 3 is replaced as shown in FIG. 10, instead of that shown in FIG. 5. Because the flow chart in FIG. 10 is merely what Steps b10 through b13 are added to Steps b1 through b3 of the flow chart in FIG. 5, the explanation of the same operation and of the structure of the apparatus will be omitted here.

In Step b10 implemented after processing the input from the operator in Step b3, it is determined whether or not the input from the operator is what instructs to erase the document selecting area 8. When it is determined to be Yes, the process advances to Step b11 to erase the document selecting area 8 and returns to Step b3. When it is No, the process advances to Step b12.

In Step b12, it is determined whether or not the input from the operator instructs to display the document selecting area 8. When it is determined to be Yes, the process advances to Step b13 to display the document selecting area 8 and returns to Step b3. When it is No, the process directly returns to Step b3.

As described above, according to the fourth embodiment, the operator can arbitrarily select erasure or display of the document selecting area 8. That is, the document selecting area 8 may be erased by selecting erasure by the input section 2. For instance, the document selecting area 8 may be erased when a document to be displayed in the document displaying area 7 is defined. Accordingly, the visibility can be improved by erasing the document selecting area 8 which has become unnecessary. Further, the document selecting area 8 can be displayed by designating display by the input section 2 and a document to be displayed in the document displaying area 7 may be changed for example.

Figure 11A:
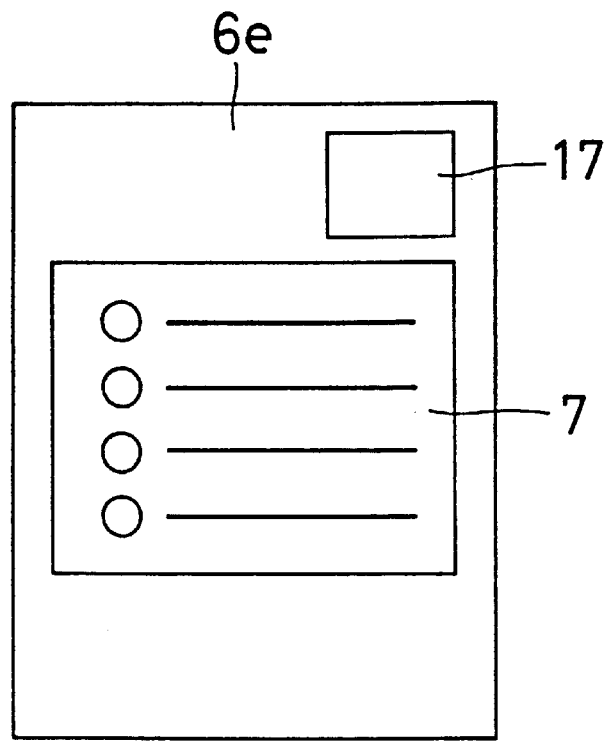
FIGS. 11A and 11B show display screens 6e and 6f of a document display apparatus according to a fifth embodiment of the invention, respectively.
Figure 11B:
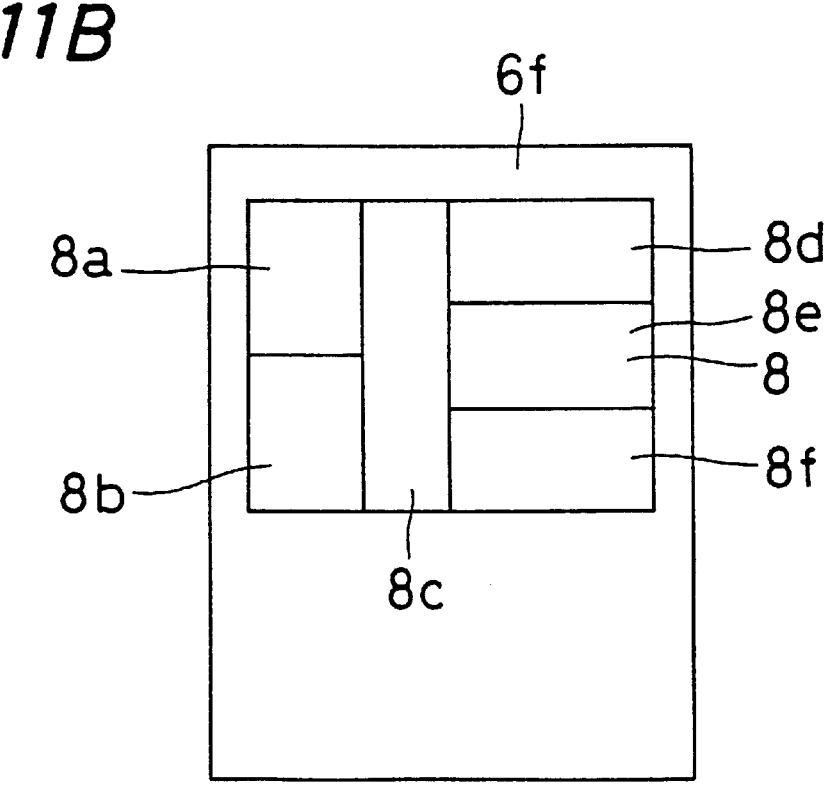

FIGS. 11A and 11B show display screens 6e and 6f a document display apparatus, respectively, according to a fifth embodiment of the invention. While this document display apparatus is constructed in the same manner as the document display apparatus 1a described before, it is characterized in that only the document selecting area 8 is displayed on the display section 4. In concrete, a display designating area 17, for designating display of the document selecting area 8, and the document displaying area 7 are displayed on the display screen 6e at first as shown in FIG. 11A. Next, when the display designating area 17 is pointed by the input pen of the input section 2 for example, the display screen 6f in which only the document selecting area 8 is displayed is formed as shown in FIG. 11B. The document selecting area 8 is divided into the plurality of areas 8a through 8f as described before. The document selecting area 8 may be expanded and displayed across the whole display screen at this time.

Figure 12:
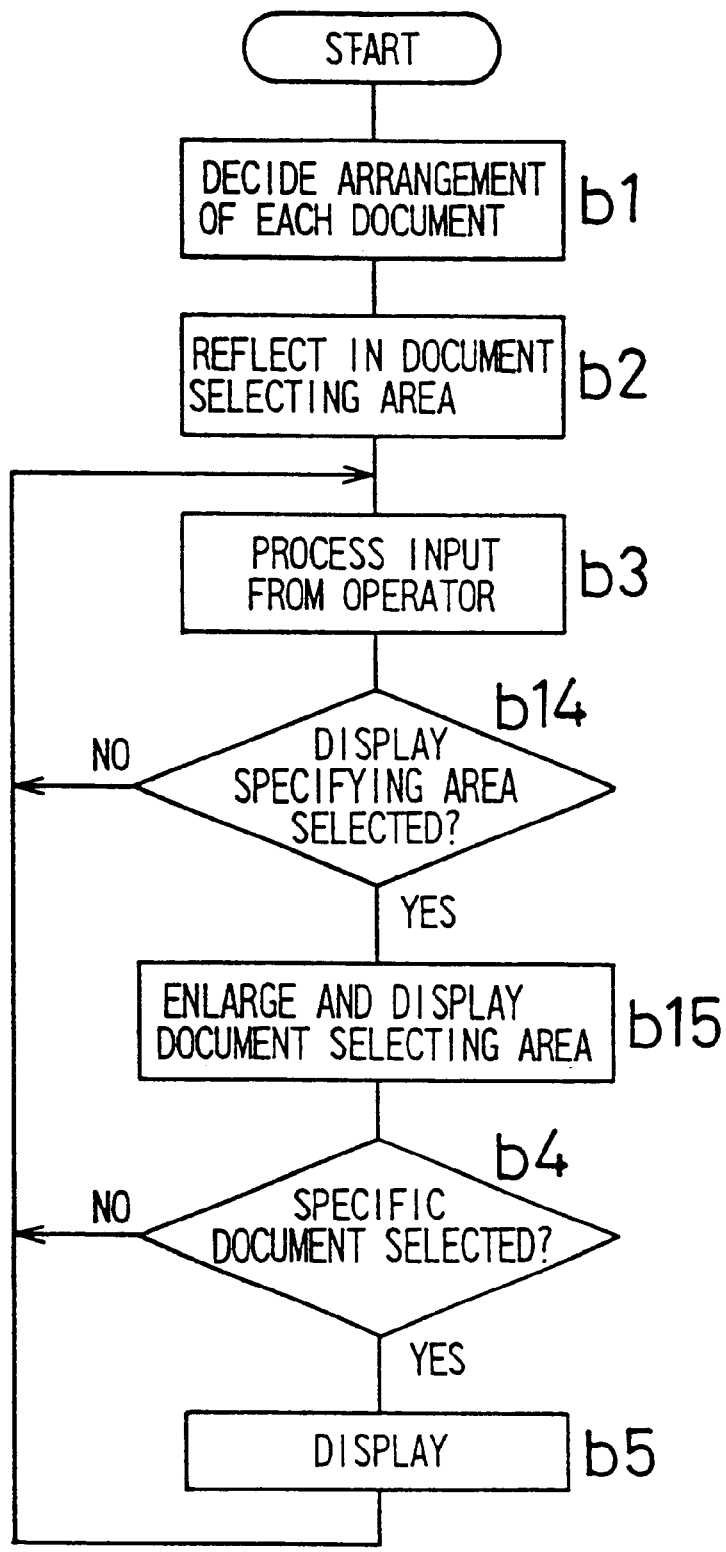
FIG. 12 is a flow chart showing an operation of the document display apparatus according to the fifth embodiment of the invention.

FIG. 12 is a flow chart showing an operation of a document display apparatus according to the fifth embodiment of the invention. The document display apparatus is characterized in that the operation for displaying the plurality of documents of the document display apparatus 1a in Step a5 in FIG. 3 is replaced as shown in FIG. 12, instead of that in FIG. 5. Because the flow chart shown in FIG. 12 is merely what Steps b14 and b15 are added to Steps b1 through b5 in the flow chart in FIG. 5, the explanation of the same operation and of the structure of the apparatus will be omitted here.

At first, in step b14 implemented after processing the input from the operator in step b3, in the state in which the display screen 6e shown in FIG. 11A is displayed, it is determined whether or not the display designating area 17 has been selected by the input from the operator. When it has been selected, the process advances to Step b15 and when it has not, the process returns to Step b3. The display screen 6f shown in FIG. 11B is displayed in Step b15. Then, the process advances to Step b4.

In Step b4, it is determined whether or not a single area has been selected among the plurality of areas 8a through 8f of the document selecting area 8 by the input from the operator. When it has been selected, the process advances to Step b5 to display the data of the document corresponding to the selected area in the document displaying area 7. That is, the display screen 6e as shown in FIG. 11A is displayed and the process returns to Step b3. When no area has been selected, the process directly returns to Step b3.

As described above, according to the fifth embodiment, only the document selecting area 8 may be displayed in selecting a document to be displayed in the document displaying area 7. At this time, the visibility may be improved by displaying the document selecting area 8 across the whole display screen for example.

Figure 13A:
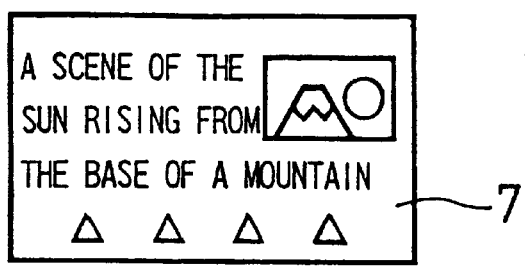
FIGS. 13A and 13B show a document displaying area 7 and the document selecting area 8 of a document display apparatus according to a sixth embodiment of the invention.
Figure 13B:
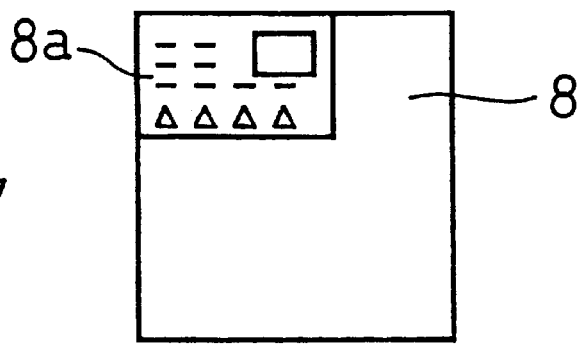

FIGS. 13A and 13B show the document displaying area 7 and the document selecting area 8 of a document display apparatus according to-a sixth embodiment of the invention. While this document display apparatus is constructed in the same manner as the document display apparatus 1a described before, it is characterized in that data of a document is converted by a predetermined converting condition and is displayed in the corresponding area 8a within the document selecting area 8.

In concrete, with respect to the document displaying area 7 in which the data of the document is displayed as shown in FIG. 13A, the converted data of the document is reduced and displayed also in the corresponding area 8a of the document selecting area 8 as shown in FIG. 13B.

Figure 14:
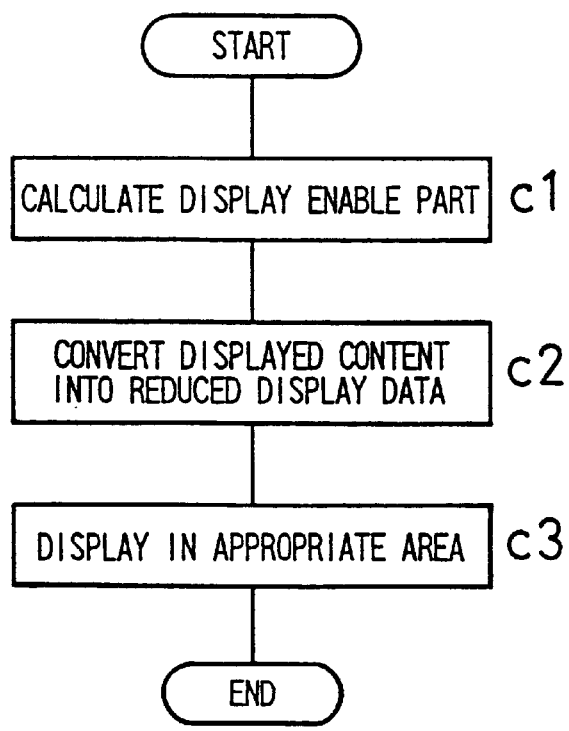
FIG. 14 is a flow chart showing an operation for displaying the document selecting area of the document display apparatus according to the sixth embodiment of the invention.

FIG. 14 is a flow chart showing an operation for displaying the document selecting area 8 of the document display apparatus according to the sixth embodiment of the invention. In Step c1, a part which can be displayed is calculated from the data of the document. That is, a part of the data of the document to be displayed in the area 8a is calculated. For instance, when the document selecting area 8 has the same size with the document displaying area 7, the part of the data of the document which matches with the area 8a is calculated.

Figures 15, 16:
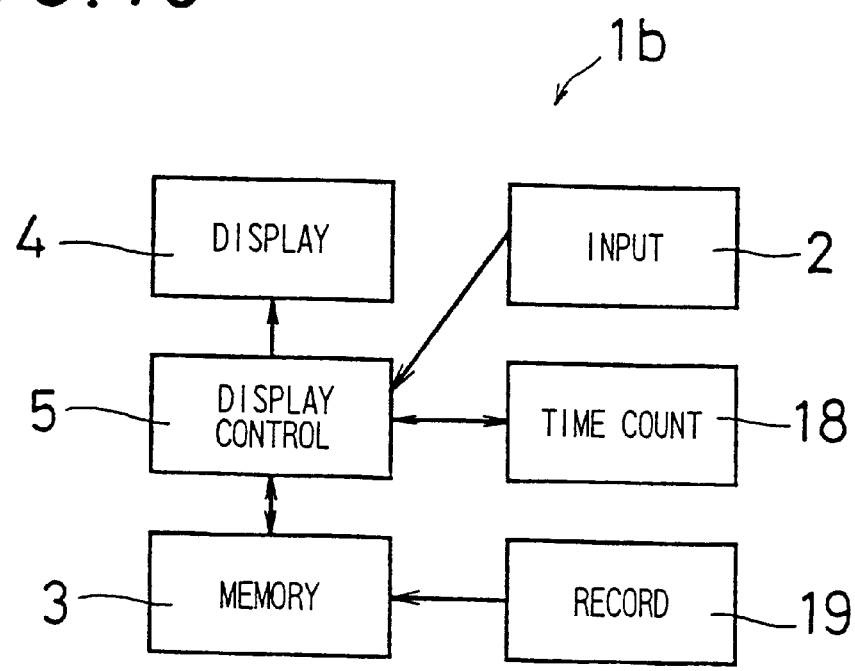
FIG. 15 is a table showing predetermined conversion conditions in converting document data.
FIG. 16 is a block diagram showing an electrical structure of a document display apparatus 1b according to a seventh embodiment of the invention.

In Step c2, the calculated part of the data of the document is converted with a predetermined converting condition. For instance, the displayed content is reduced with a rate when the document selecting area 8 is set to have the same size with the document displaying area 7. Further, elements 16 in reduced display such as dotted lines, a rectangle and simple reduction are set in correspondence to types of displayed elements 15 such as letters, pictures and graphics as shown in FIG. 15 to convert the data in accordance with this condition. The converted data of the document is displayed in the area 8a in Step c3.

Thereby, the letters, the pictures and the graphics as shown in FIG. 13A are converted into and displayed as the dotted lines, the rectangle and the simple reduction as shown in FIG. 13B.

As described above, according to the sixth embodiment, the corresponding data of the document converted under the predetermined converting condition is displayed in each area within the document selecting area 8. Accordingly, the data of the document may be perceived also within the document selecting area 8. For instance, its outline may be perceived.

FIG. 16 is a block diagram showing an electrical structure of a document display apparatus 1b according to a seventh embodiment of the invention. While this document display apparatus 1b is constructed almost in the same manner as the document display apparatus 1a described above, it is characterized in that it further comprises a time measuring section 18 and a recording section 19.

The recording section 19 is means for reading data from an original document in which a multi-media document is written. The data of the document obtained by the recording section 19 is stored in the memory section 3. The time measuring section 18 measures a predetermined time.

The display control section 5 also indicates that the recording section 19 is in the midst of obtaining the data of the document by using the display section 4 to inform of that to the operator.

Figure 17:
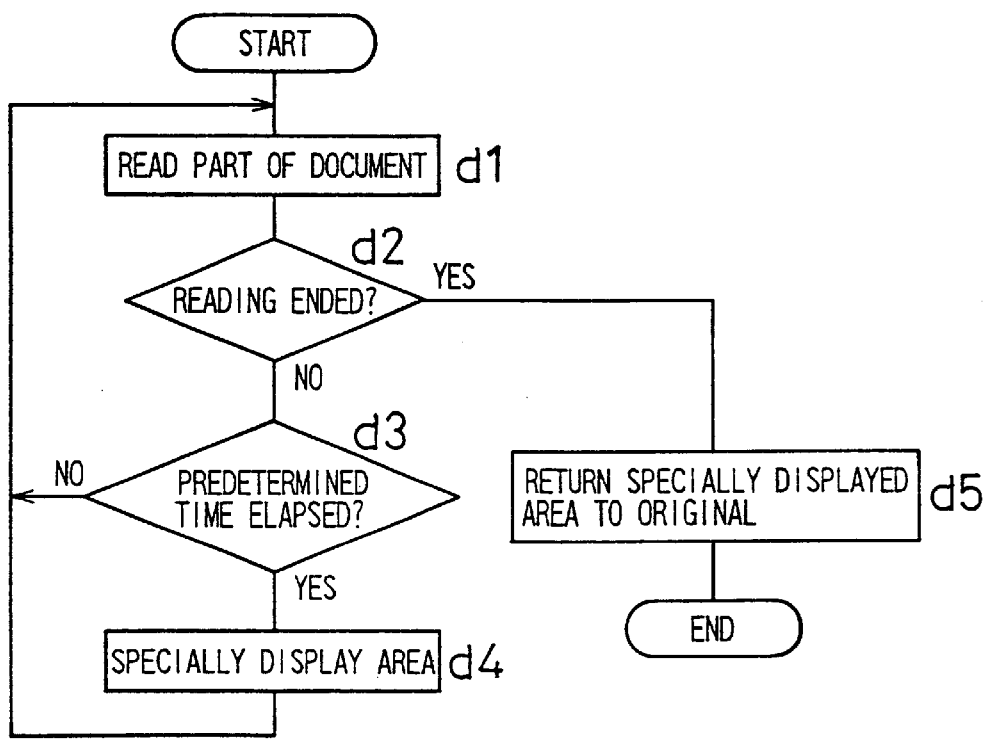
FIG. 17 is a flow chart showing an operation for reading document data of the document display apparatus 1b.

FIG. 17 is a flow chart showing document data reading operation of the document display apparatus 1b. The document data to be displayed is read from the recording section 19 to the document display apparatus 1b in Step d1. It is then determined in Step d2 whether or not the reading has been finished. When it is determined not to have been finished, the process advances to Step d3 to determine whether or not the measurement of the predetermined time by the time measuring section 18 has been finished. When it is determined that the measurement has been finished, the process advances to Step d4 to display the displayed contents in a special manner, e.g. by flashing it, and returns to Step d1. When it is determined that the measurement of the predetermined time has not been finished in Step d3, the process returns to Step d1.

When it is determined in Step d2 that the reading of the document data has been finished, the process advances to Step d5 to eliminate the special display and ends the operation.

As described above, according to the seventh embodiment, the document selecting area 8 and the document displaying area 7 as described above may be created with respect to the document data obtained from the recording section 19. Further, it is informed that the recording section 19 is in the midst of obtaining the document data by indicating by means of flashing or the like. Accordingly, the operator can recognize that it is in the midst of obtaining the document data.

Figure 18:
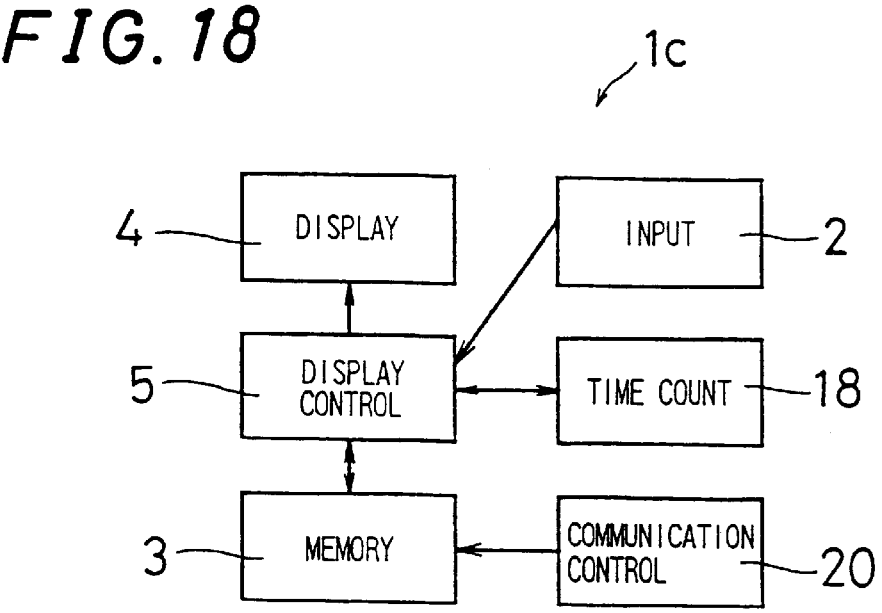
FIG. 18 is a block diagram showing an electrical structure of a document display apparatus 1c which is a modification of the seventh embodiment of the invention.

It is noted that a case of constructing a document display apparatus 1c by providing a communication control section 20 shown in FIG. 18, instead of the recording section 19 in the seventh embodiment, is also included in the scope of the invention. The communication control section 20 receives document data from an external terminal device such as a personal computer.

Figure 19:
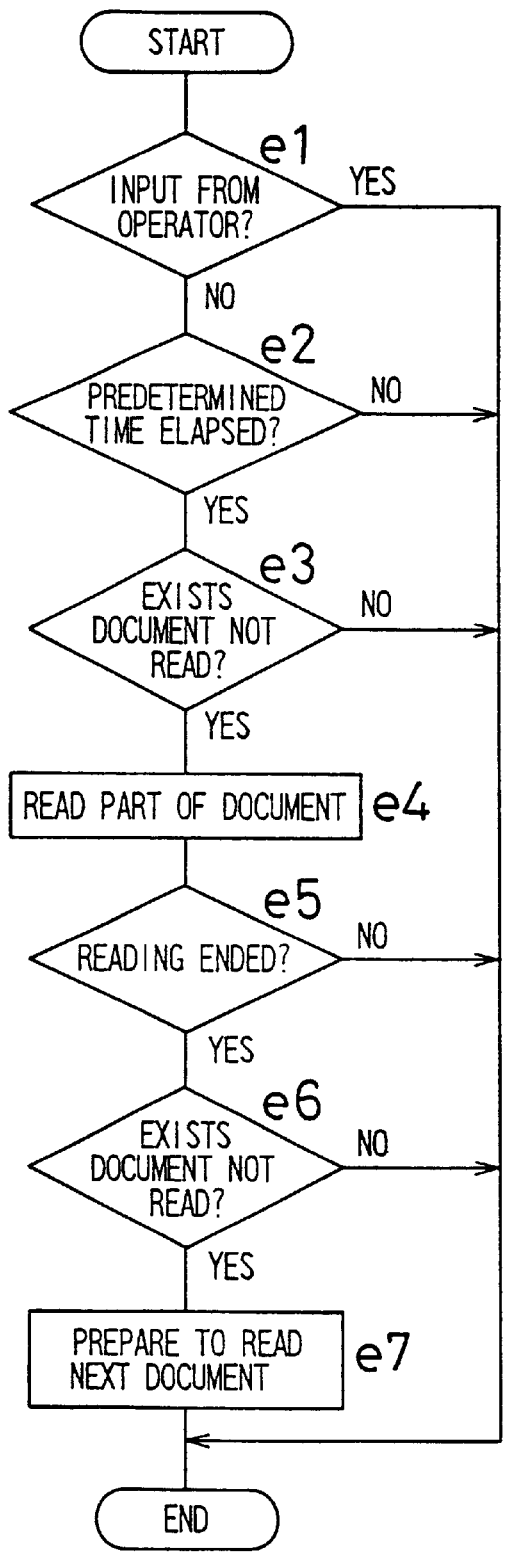
FIG. 19 is a flow chart showing an operation for storing document data in a memory section 3 of a document display apparatus according to an eighth embodiment of the invention.

FIG. 19 is a flow chart showing an operation for storing document data in the memory section 3 of a document display apparatus according to an eighth embodiment of the invention. While this document display apparatus is constructed in the same manner as the document display apparatus 1b, it is characterized in that the memory section 3 of this document display apparatus stores not only the data of a document corresponding to a single area selected from the plurality of areas of the document selecting area 8 but also data of documents corresponding to the remaining areas not selected.

That is, when the document display apparatus 1b is arranged so as to store only the data of the document selected in the document selecting area 8 to the memory section 3 in displaying the data of the selected document in the document displaying area 7 in Step b5 in FIG. 5, the data must be read again from the recording section 19 in changing the document to be displayed in the document displaying area 7. Further, each time when the document to be displayed in the document selecting area 8 is changed, data of the document must be stored in the memory section 3. However, according to the present embodiment, the memory section 3 automatically stores not only the data of the document selected in the document selecting area 8 but also the data of the document not selected during the selection, so that the data of the document to be displayed in the document displaying area 7 may be readily changed by using the data of the document stored in the memory section 3.

In Step e1, it is determined whether or not an input has been made by the operator from the input section 2. When it is determined that no input has been made, the process advances to Step e2 to determine whether or not a predetermined time has elapsed. When it is determined that it has elapsed, it is determined in Step e3 whether or not there exists data of a document not read into the document display apparatus yet. When it is determined to exist, the part of the data of the document is read from the recording section 19 in Step e4.

It is determined in Step e5 whether or not the reading of the data of the document has been finished. When it is determined that it has been finished, it is determined in Step e6 whether or not there exists data of a document to be read next. When it is determined to exist, pre-processing for next reading the data of the document is implemented in Step e7 and the operation is finished. Through this pre-processing, the next reading of the data of the document is carried out in the next Step e4.

It is noted that the operation is finished when it is determined in Step e1 that an input has been made by the operator, when it is determined in Step e2 that the predetermined time has not elapsed, when it is determined in Step e3 that no document which has not been read exists, when it is determined in Step e5 that the reading has not been finished and when it is determined in Step e6 that there exists no document to be read next.

As described above, according to the eighth embodiment, the memory section 3 stores not only the data of the data of the document corresponding to a single area selected from the plurality of areas of the document selecting area 8 but also the data of the document corresponding to the remaining areas not selected. Accordingly, data of all documents may be reliably stored and the change of the display in the document displaying area 7 can be readily made.

It is noted that a case of applying the eighth embodiment to the document display apparatus 1c shown in FIG. 18 is also included within the scope of the invention.

Next, a document display apparatus of a ninth embodiment of the invention will be explained. While the document display apparatus of the ninth embodiment is constructed in the same manner as the document display apparatus 1a, the document display apparatus of the ninth embodiment is characterized in that data of a document described in the HTML language Is handled for which execution or non-execution of a frame function of displaying together with data of other document can be designated.

When the execution of the frame function is designated, the display control section 5 displays the document selecting area 8 on the display section 4, and when a single area is selected among the plurality of areas of the document selecting area 8, the display control section 5 displays the data of the document corresponding to the selected area within the document displaying area 7 of the display section 4.

The operation of the document display apparatus of the ninth embodiment will be explained with reference to FIG. 3. HTML document data to be displayed is read to the document display apparatus in Step a1 and the read data is then interpreted in Step a2. In Step a3, it is determined whether or not the read HTML data of the document contains an instruction to display together with the HTML data of other document. It is determined whether the HTML data of the document contains an instruction to use the frame function. It is determined by interpreting the following first HTML document data for example:

(First HTML Document Data)
<HTML>
<FRAMESET COLS="50%, 50%">
<FRAME SRC="document1. html">
<FRAMESET ROWS="40%, 60%">
<FRAME SRC="document2. html">
<FRAME SRC="document3. html">
</FRAMESET>
</FRAMESET>
</HTML>

Because there are descriptions of <FRAME> and <FRAMESET> in such first HTML document data, it is determined that the frame function is being used. When it is determined that the instruction of using the frame function is contained, the process advances to Step a4 and when it is not, the operation is finished.

Figure 20:
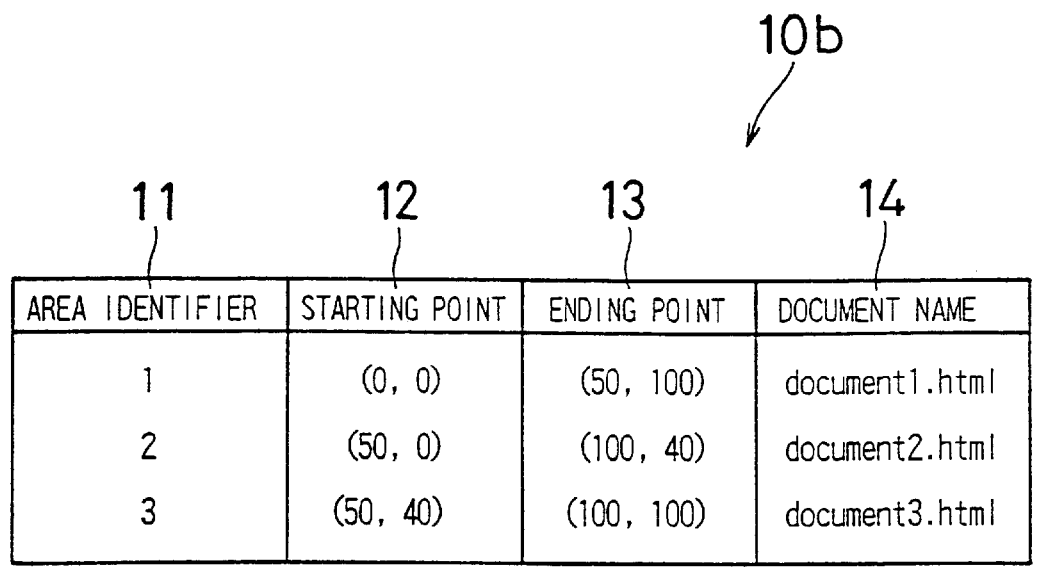
FIG. 20 is a table showing document arrangement information 10b.

In Step a4, document arrangement information 10b similar to the document arrangement information 10a is generated. The document arrangement information 10b comprises, as shown in FIG. 20, each area identifier 11, the coordinate point 12 indicating a display starting point of each area, the coordinate point 13 indicating a display ending point of each area and each document name 14.

In Step a5, the document selecting area 8 is displayed on the display section 4 based on the document arrangement information 10b thus generated and an operation for displaying a plurality of documents by using the document selecting area 8 is executed. Then, the operation is finished.

Figure 21:
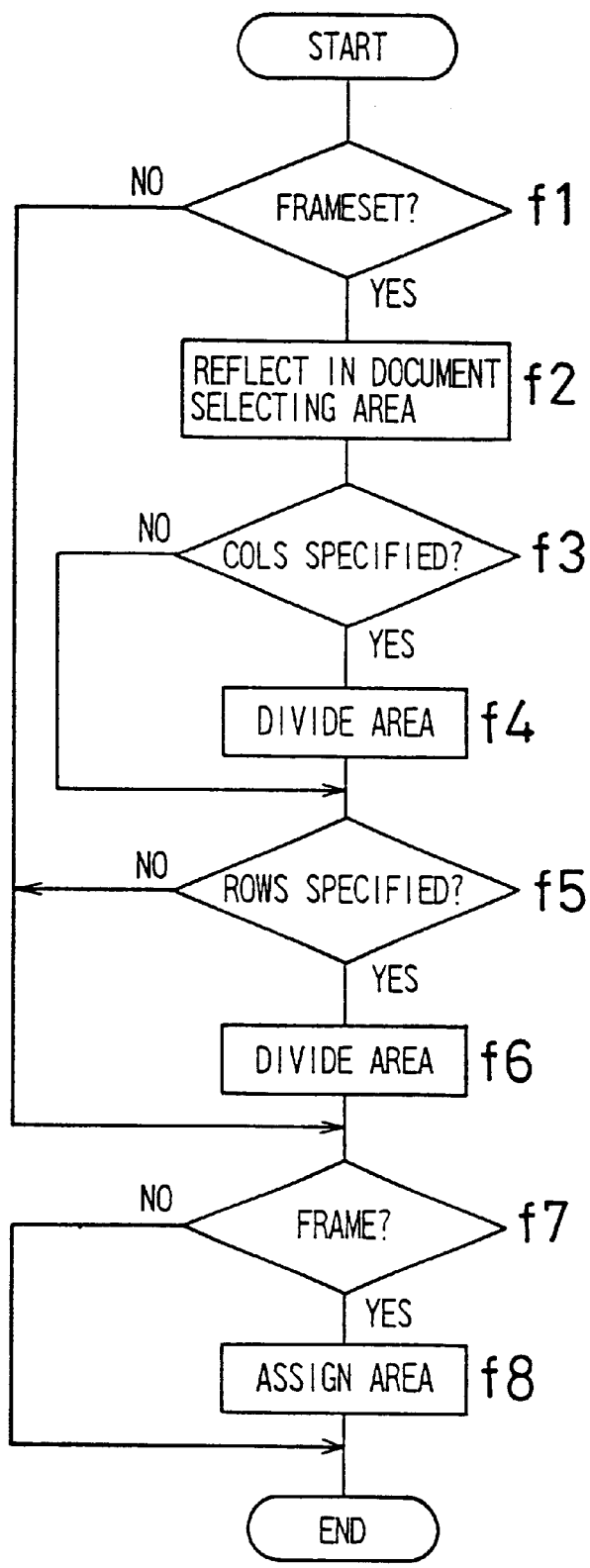
FIG. 21 is a flow chart showing an operation for obtaining the document arrangement information 10b.

FIG. 21 is a flow chart showing an operation for obtaining the document arrangement information 10b. In Step f1, it is determined whether or not there exists a description of <PRAMESET> in each line of the document data. When it is determined that there exists such description, the process advances to Step f2 to reflect it in the document selecting area 8 and when it is determined that there exists no such description, the process advances to Step f7.

In Step f3, it is determined whether or not there exists a description of <COLS>. When it is determined that there exists such description, the process advances to Step f4 and when it is determined that there exists no such description, the process advances to Step f5. In Step f4, the area is divided in the direction of column in accordance with the instruction of <COLS>.

In Step f5, it is determined whether or not there exists a description of <ROWS>. When it is determined that there exists such description, the process advances to Step f6 and when it is determined that there exists no such description, the process advances to Step f7. In Step f6, the area is divided in the direction of row in accordance with the instruction of <ROWS>.

In Step f7, it is determined whether or not there exists the description of <FRAME>. When it is determined that there exists such description, the process advances to Step f8 and when it is determined that there exists no such description, the operation is finished. In Step f8, the HTML document data of <FRAME> designation is assigned to an area to which no document data is assigned yet. The operation is then finished.

Figure 22A:
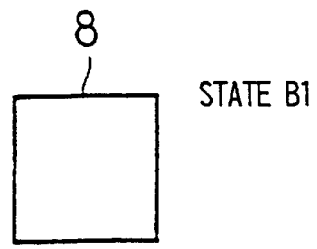
FIGS. 22A through 22F are diagrams for explaining the operation for obtaining the document arrangement information 10b.
Figure 22B:
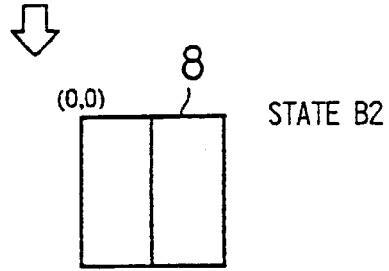
Figure 22C:
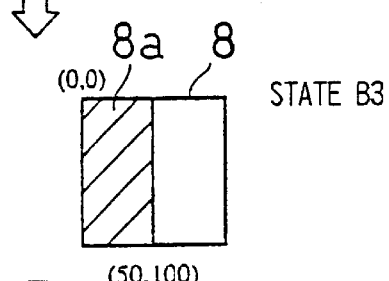
Figure 22D:
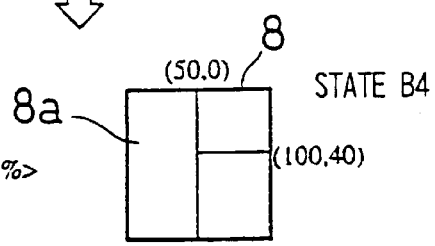
Figure 22E:
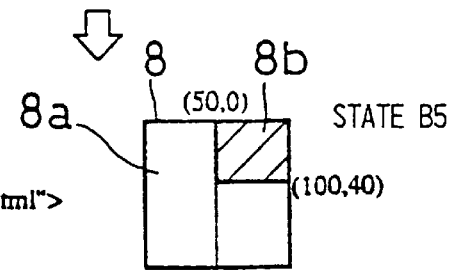
Figure 22F:
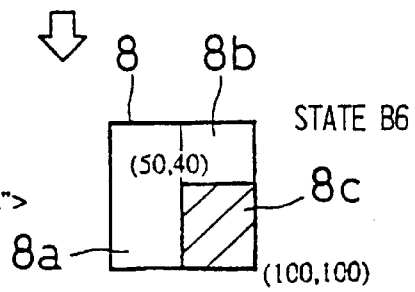
Figure 23:
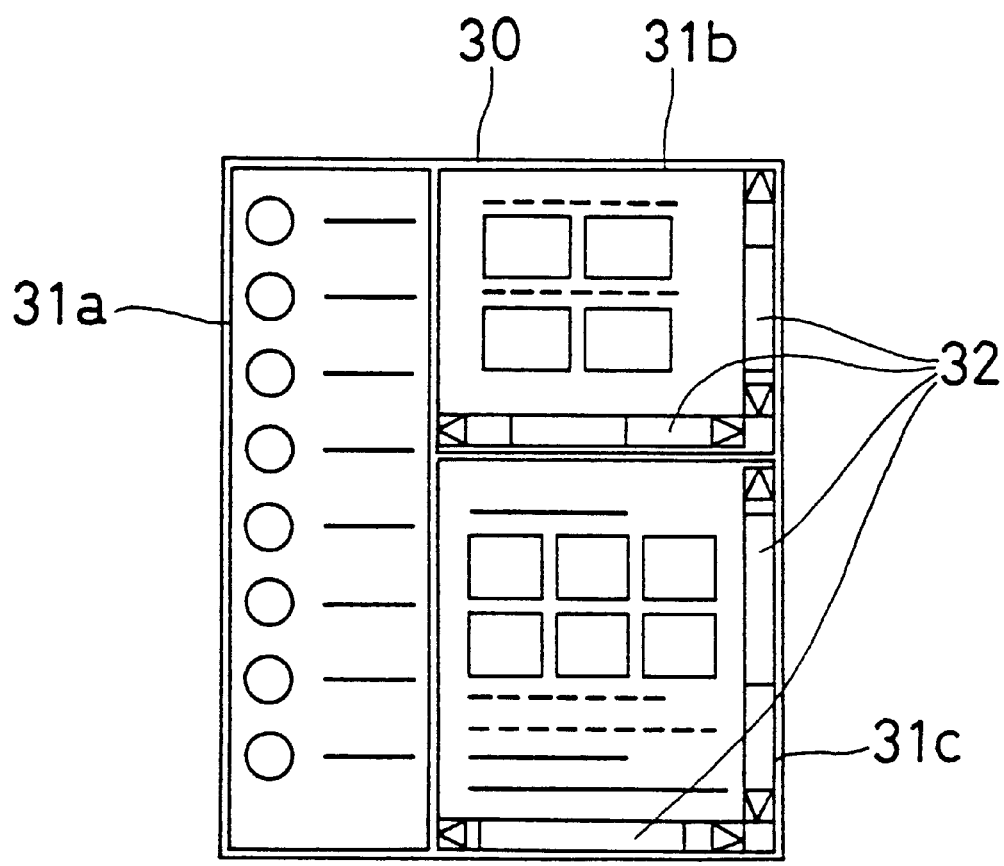
FIG. 23 is a diagram showing a display screen 30 of a prior art document display apparatus.

FIGS. 22A through 22F are diagrams for explaining the operation for obtaining the document arrangement information 10b. Based on the document arrangement information 10b, the document selecting area 8 in State B1 shown in FIG. 22A is divided in the direction of column in State B2 as shown in FIG. 22B and the first area 8a is set in State B3 as shown in FIG. 22C. The area is divided in the direction of raw in State B4 as shown in FIG. 22D, the second area 8b is set in State B5 as shown in FIG. 22E and the third area 8c is set in State B6 as shown in FIG. 22F.

As described above, according to the ninth embodiment, the document selecting area 8 is displayed on the display section 4 and when a single area is selected from the plurality of areas of the document selecting area 8, the document data corresponding to the selected area may be displayed in the document displaying area 7 of the display section 4 even when the HTML language is adopted, so that the plurality of documents can be displayed in high visibility as a whole without displaying the plurality Of documents on the single display section 4 at the same t ime.

Next, a document display apparatus of a tenth embodiment of the invention will be explained. While this document display apparatus is constructed in the same manner as the document display apparatus in the ninth embodiment, it is characterized in that it displays HTML document data within the document displaying area 7 when it is designated not to execute the frame function in the HTML document data.

The operation of the document display apparatus of the tenth embodiment will be explained with reference to FIG. 3. HTML document data to be displayed is read in Step a1. Assume that the following second HTML document data is read for example:

(Second HTML Document Data)
<HTML>
<FRAMESET COLS="50%, 50%">
<FRAME SRC="document1. html">
<FRAMESET ROWS="40%, 60%">
<FRAME SRC="document2. html">

```
<FRAME SRC="document3. html">
</FRAMESET>
</FRAMESET>
<NOFRAMES>
- :
  :
</NOFRAMES>
</HTML>
```

The read second HTML document data is then interpreted in Step a2. In Step a3, It is determined as a result of the Interpretation whether or not the read second HTML data contains the descriptions of <FRAME>and <FRAMESET>. When it is determined that there exist such descriptions, the process advances to Step a4 and when it is determined that there exist no such description, the operation is finished. In Step a4, the document arrangement Information 10*b* is generated.

In Step a5, the document selecting area 8 is displayed on the display section 4 based on the document arrangement information 10*b* thus generated and the operation for displaying the plurality of documents by using the document selecting area 8 is executed. The operation is then finished. That is, the displaying operation is executed in accordance with Steps in FIG. 5.

However, <NOFRAMES> is designated for the second HTML document data and the contents to be displayed in <NOFRAMES>, that is, when the frame function is not used, is specified, so that the document arrangement information 10*b* is reflected to the document selecting area 8 in Step b2 and the document data is displayed in the document displaying area 7. The document data displayed here is the data existing between <NOFRAMES> and </NOFRAMES>.

As described above, according to the tenth embodiment, the document data for which non-execution of frame function is designated is displayed within the document displaying area 7 immediately, so that the document may be displayed in the document displaying area 7 without selecting a single area from the document selecting area 8, thus improving the operability. The two functions of displaying the selected document in the document displaying area 7 by using the document selecting area 8 when the frame function is to be executed, and of displaying the document immediately in the document displaying area 7 when no frame function is used, can be executed appropriately.

The invention may be embodied in other specific forms Without departing from the spirit or essential characteristics thereof. The present embodiments are therefore to be considered in all respects as illustrative and not restrictive, the scope of the invention being indicated by the appended claims rather than by the foregoing description and ail changes which come within the meaning and the range of equivalency of the claims are therefore intended to be embraced therein.

What is claimed is:

1. A document display apparatus comprising:
   a memory for storing document data of a multimedia document containing pictures and letters, the document data containing data indicative of whether or not the document data is related to document data of one or more other multimedia documents each to be displayed at the same time together with, and at a particular position relative to, the multimedia document;
   a display having a document displaying area for displaying the multimedia document; and
   a display control circuit for determining if the document data for the displayed multimedia document is related to document data of any other multimedia documents and, if so, for causing the display to display a document selecting area composed of a plurality of areas, each area corresponding to one multimedia document from a group of multimedia documents including the displayed multimedia document and the multimedia documents related thereto,
   wherein, when a single area is selected from the plurality of areas of the document selecting area, said display control circuit causes the display to display in the document displaying area the multimedia document corresponding to the selected single area, and
   wherein the areas of the document selecting area provide a single-screen view that visually depicts two-dimensional positional relationships among the multimedia document displayed in the document displaying area and the multimedia documents related thereto so that the relationships among the multimedia document displayed in the document displaying area and all of the multimedia documents related thereto can be visually perceived at the same time as a whole in the document selecting area.

2. The document display apparatus of claim 1, wherein the display control circuit causes the display to display the document selecting area only when the display control circuit determines that the document data for the multimedia document displayed in the document display area is related to document data of other multimedia documents.

3. The document display apparatus of claim 1, wherein the document selecting area is movably displayed on the display, the document display apparatus further comprising moving means for moving the document selecting area.

4. The document display apparatus of claim 1, wherein the document selecting area is erasably displayed on the display, the document display apparatus further comprising designating means for designating whether the document selecting area should be displayed or erased.

5. The document display apparatus of claim 1, wherein the display control circuit converts the document data of the displayed multimedia document and the multimedia documents related thereto under a predetermined converting condition to cause the converted document data to be displayed within a corresponding area of the document selecting area.

6. The document display apparatus of claim 1, the document display apparatus further comprising a reading device for reading document data from an original which is a multi-media document or a receiving device for receiving document data from an external terminal apparatus, wherein the memory stores the document data obtained by the reading device or the receiving device.

7. The document display apparatus of claim 6, wherein the display control circuit causes the display to display that the reading device or the receiving device is in the midst of obtaining the document data.

8. The document display apparatus of claim 6, wherein the memory stores not only the document data corresponding to a single area when the single area is selected from the plurality of areas in the document selecting area but also the document data corresponding to the remaining areas not selected.

9. The document display apparatus of claim 1, wherein the document data is document data described in the HTML language for which execution of a frame function for displaying the document data together with document data of other documents or non-execution of the frame function can be designated, and the display control circuit causes the display to display the document selecting area when the execution of the frame function Is designated.

10. The document display apparatus of claim 9, wherein the display control circuit causes the document data described in the HTML language to be displayed within the document displaying area when non-execution of the frame function is designated for said document data.

11. The document display apparatus according to claim 1, wherein the document selecting area is non-scrollable.

12. The document display apparatus according to claim 11, wherein each area of the document selecting area is non-scrollable.

13. The document display apparatus according to claim 1, wherein the multimedia document and all of the multimedia documents related thereto can be visually perceived at the same time as a whole in the document selecting area without displaying the concrete contents thereof.

14. A document display apparatus comprising:
a memory for storing document data of a multimedia document containing pictures and letters, the document data containing data indicative of whether or not the document data is related to document data of one or more other multimedia documents each to be displayed at the same time together with, and at a particular position relative to, the multimedia document;
a display having a document displaying area for displaying the multimedia document;
a designating device for designating display on the display of a document selecting area composed of a plurality of areas each corresponding to one multimedia document from a group of multimedia documents including the displayed multimedia document and any multimedia documents related thereto; and
a display control circuit for causing the display to display the document selecting area instead of the document displaying area on the basis of instructions from the designating device, and, when a single area is selected from the plurality of areas of the document selecting area, for causing the display to display the document displaying area instead of the document selecting area and to display the multimedia document corresponding to the selected area in the document selecting area,
wherein the areas of the document selecting area provide a single-screen view that visually depicts two-dimensional positional relationships among the multimedia document displayed in the document displaying area and any multimedia documents related thereto so that the relationships among the multimedia document displayed in the document displaying area and all of the multimedia documents related thereto can be visually perceived at the same time as a whole in the document selecting area.

15. The document display apparatus according to claim 14, wherein the document selecting area is non-scrollable.

16. The document display apparatus according to claim 15, wherein each area of the document selecting area is non-scrollable.

17. The document display apparatus according to claim 14, wherein the multimedia document and all of the multimedia documents related thereto can be visually perceived at the same time as a whole in the document selecting area without displaying the concrete contents thereof.

18. A document display apparatus for displaying multimedia documents, comprising:
a display;
a display control circuit for controlling the display to provide a document selecting area and a document display area; and
an input device operable to select a multimedia document for display in the document display area,
wherein said display control circuit is configured to determine whether the selected multimedia document is related to one or more other multimedia documents each to be displayed at the same time together with, and at a particular position relative to, the selected document, and, if so, to provide on the display a document selecting area that includes areas each of which respectively corresponds to one multimedia document from a group of multimedia documents including the selected multimedia document and the multimedia documents related thereto, the areas being arranged to provide a single-screen view that visually depicts two-dimensional positional relationships among the selected multimedia document and the multimedia documents related thereto so that the relationships among the selected multimedia document and all of the multimedia documents related thereto can be visually perceived at the same time as a whole in the document selecting area.

19. The document display apparatus of claim 18, wherein no document selecting area is displayed if the display control circuit determines that the selected multimedia document is not related to any other multimedia documents.

20. The document display apparatus of claim 18, wherein the input device is further operable to receive inputs for changing a position of the document selecting area on the display, and the display control circuit is responsive to the position changing inputs to change the position of the document selecting area on the display.

21. The document display apparatus of claim 18, wherein the input device is further operable to receive inputs for erasing the document selecting area from the display, and the display control circuit is responsive to the erasing inputs for erasing the document selecting area from the display.

22. The document display apparatus of claim 18, wherein the displayed multimedia document is an HTML document.

23. The document display apparatus according to claim 18, wherein the document selecting area is non-scrollable.

24. The document display apparatus according to claim 23, wherein each area of the document selecting area is non-scrollable.

25. The document display apparatus according to claim 18, wherein the multimedia document and all of the multimedia documents related thereto can be visually perceived at the same time as a whole in the document selecting area without displaying the concrete contents thereof.

26. A portable document display apparatus for displaying HTML documents, comprising:
a liquid crystal display;
a display control circuit for controlling the liquid crystal display to provide a document selecting area and a document display area; and
an input device operable to select an HTML document for display in the document display area,
wherein said display control circuit is configured to determine whether the selected HTML document is related to one or more other HTML documents each to be displayed at the same time together with, and at a particular position relative to, the selected HTML document, and, if so, to provide on the display a document selecting area that includes areas each of which respectively corresponds to one HTML document from a group of HTML documents including the selected HTML document and the HTML documents related thereto, the areas being arranged to provide a single-screen view that visually depicts two-dimensional positional relationships among the selected HTML document and the HTML documents related thereto so that the relationships among the HTML document and all of the HTML documents related thereto can be visually perceived at the same time as a whole in the document selecting area.

27. The document display apparatus according to claim 26, wherein the document selecting area is non-scrollable.

28. The document display apparatus according to claim 27, wherein each area of the document selecting area is non-scrollable.

29. The document display apparatus according to claim 26, wherein the HTML document and all of the HTML documents related thereto can be visually perceived at the same time as a whole without displaying the concrete contents thereof.

* * * * *